US006400897B1

(12) United States Patent
Lin

(10) Patent No.: US 6,400,897 B1
(45) Date of Patent: Jun. 4, 2002

(54) HANDY TYPE SMOKE GENERATOR

(75) Inventor: Yu-Chuan Lin, Taipei Hsien (TW)

(73) Assignee: Everwell Lighting Co., Ltd. (TW)

( * ) Notice: Subject to any disclaimer, the term of this patent is extended or adjusted under 35 U.S.C. 154(b) by 0 days.

(21) Appl. No.: 09/777,824

(22) Filed: Feb. 7, 2001

(30) Foreign Application Priority Data

Jan. 17, 2001 (TW) ..................................... 90200867 U

(51) Int. Cl.[7] ............................ F17C 7/04; G01F 11/42
(52) U.S. Cl. ..................................... 392/405; 222/321.9
(58) Field of Search ................................ 392/386, 394, 392/396, 397, 399, 400, 401, 405; 222/255, 321.7, 321.8, 321.9

(56) References Cited

U.S. PATENT DOCUMENTS 3,476,293 A * 11/1969 Marcoux ................. 222/146.3
3,608,788 A * 9/1971 Tanaka et al. .............. 222/384
3,774,849 A * 11/1973 Boris ...................... 222/321.2
3,907,174 A * 9/1975 Steinman ............... 222/153.12
3,986,670 A * 10/1976 Syveson ..................... 392/390
5,870,524 A * 2/1999 Swiatosz .................... 392/394

* cited by examiner

*Primary Examiner*—Sang Paik

(74) *Attorney, Agent, or Firm*—Troxell Law Office PLLC

(57) ABSTRACT

A handy type smoke generator includes a housing, a container, a drawing device, a transfer tube, a heat-resisting tube and a heating vaporizing device. The smoke generator is characterized in that a drawing device is provided between the container and the transfer tube, and includes a hollow tube fitted with a fastening ring member, and a core rod with an elastic ring connected thereto below. The core rod is provided with a through rod hole. A sealing cap abuts against the fastening ring member. A hollow pump is coupled with the fastening ring member such that the sealing cap is sandwiched therebetween. The elastic ring abuts against the inner wall of the pump. The pump has a retractable spring disposed therein and between the core rod and the bottom portion of the pump, and a plug ball removably closes a pump hole in the bottom portion of the pump. The bottom portion of the pump is further provided with an extension tube for extension into the bottom portion of the container. The tube has a top portion fitted with a press member which is formed with a liquid outlet in a lateral side thereof for connection with the transfer tube. The sealing cap is used to connect with the coupling portion at the top portion of the container. By pressing and releasing the press member several times, the solution within the container is pumped into the transfer tube by pumping action of the pump and flows through the heat-resisting tube into the heating vaporizing device. The solution is vaporized to form smoke that is ejected via a nozzle.

4 Claims, 5 Drawing Sheets

HANDY TYPE SMOKE GENERATOR

BACKGROUND OF THE INVENTION

1. Field of The Invention:

The present invention relates to a handy type smoke generator, more particularly to a smoke generator that can be easily operated by the user via a drawing device so that the chemical solution from a container passes through a transfer tube and a heat-resisting tube to a heating vaporizing device for heating and vaporization into smoke that is ejected via a nozzle.

2. Description of Related Art:

During stage performance, smoke can enhance theatrical effects. There are two kinds of smoke effects. In one; the smoke fills the air above. In the other, the smoke stays near to the stage floor. Generally, dry ice is used to create smoke. However, it is quite costly.

Another way of creating smoke on stage is use a smoke generator, such as that shown in FIG. 1. In the conventional smoke generator as shown, an electric pump (A) is actuated to pump up a chemical solution (C) from a container (D) via a transfer hose (B), which is passed through a heat-resisting tube (E) on the other side and is conducted into a heating vaporizing device (F) directly. During passage of the solution (C) through the heating vaporizing device (F), it is gradually heated to become vaporized so that smoke is ejected from a nozzle (G) of the heating vaporizing device (F).

As the electric pump (A) is indispensable for pumping out the solution (C), apart from being expensive, professional technicians are required for operation to prevent damage due to misuse. With the popularity of entertainment venues (such as KTVs) and home entertainment equipment, it is now possible to create stage effects at entertainment venues or home. Therefore, simplified stage lights have been widely adopted at KTVs or homes. However, the drawback with the conventional smoke generator makes it difficult to become popular.

SUMMARY OF THE INVENTION

The primary object of the present invention is to provide a DIY type smoke generator.

According to the preferred embodiment of the present invention, the smoke generator includes a housing, a container, a drawing device, a transfer tube, a heat-resisting tube and a heating vaporizing device. The smoke generator is characterized in that a drawing device is provided between the container and the transfer tube, and includes a hollow tube fitted with a fastening ring member, and a core rod with an elastic ring connected thereto below. The core rod is provided with a through rod hole. A sealing cap abuts against the fastening ring member. A hollow pump is coupled with the fastening ring member such that the sealing cap is sandwiched therebetween. The elastic ring abuts against the inner wall of the pump. The pump has a retractable spring disposed therein and between the core rod and the bottom portion of the pump, and a plug ball removably closes a pump hole in the bottom portion of the pump. The bottom portion of the pump is further provided with an extension tube for extension into the bottom portion of the container. The tube has a top portion fitted with a press member which is formed with a liquid outlet in a lateral side thereof for connection with the transfer tube. The sealing cap is used to connect with the coupling portion at the top portion of the container. By pressing and releasing the press member several times, the solution within the container is pumped into the transfer tube by pumping action of the pump and flows through the heat-resisting tube into the heating vaporizing device. The solution is vaporized to form smoke that is ejected via a nozzle.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 2:
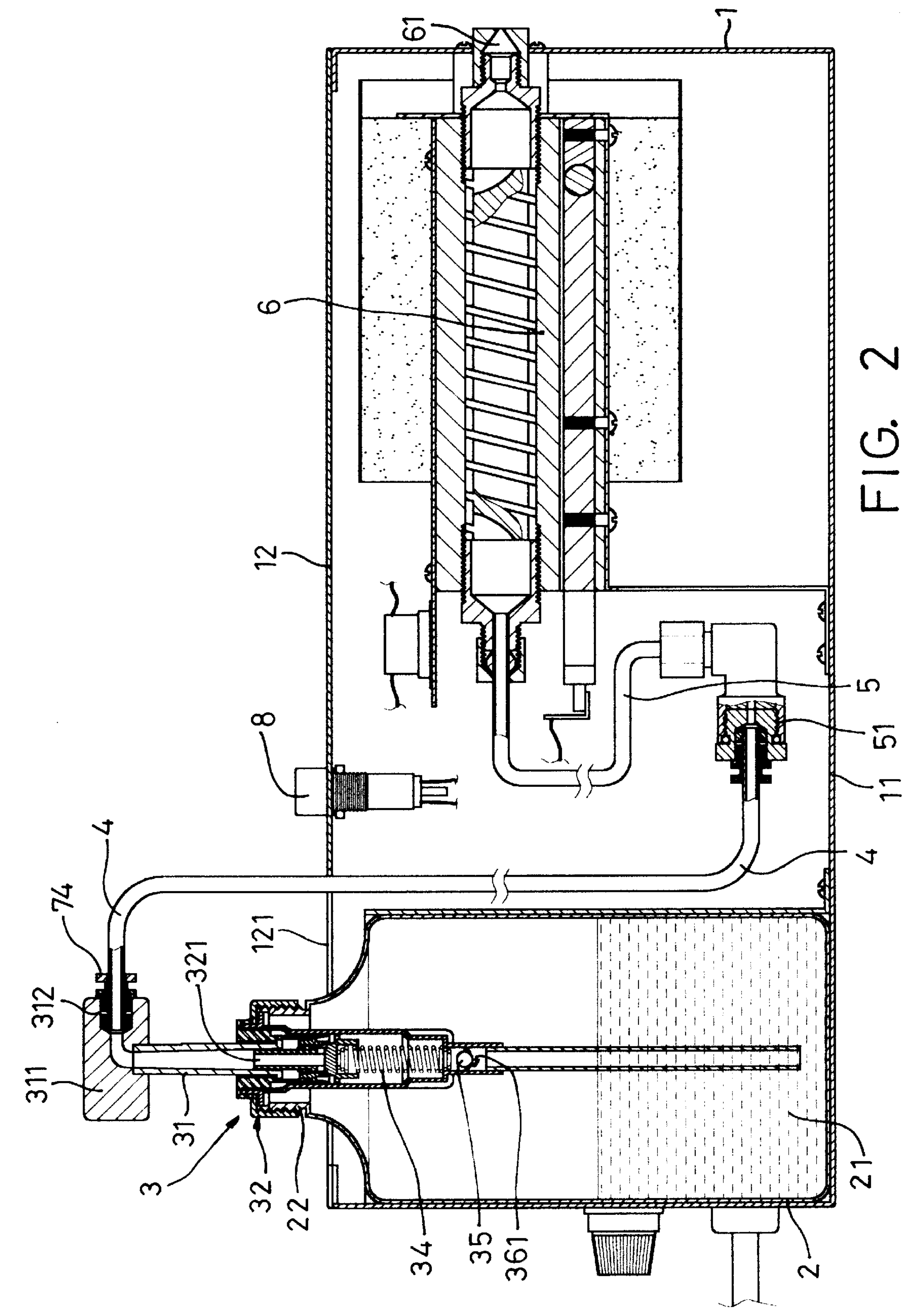
FIG. 2 is a schematic view of a smoke generator according to the present invention.
Figures 3, 3A:
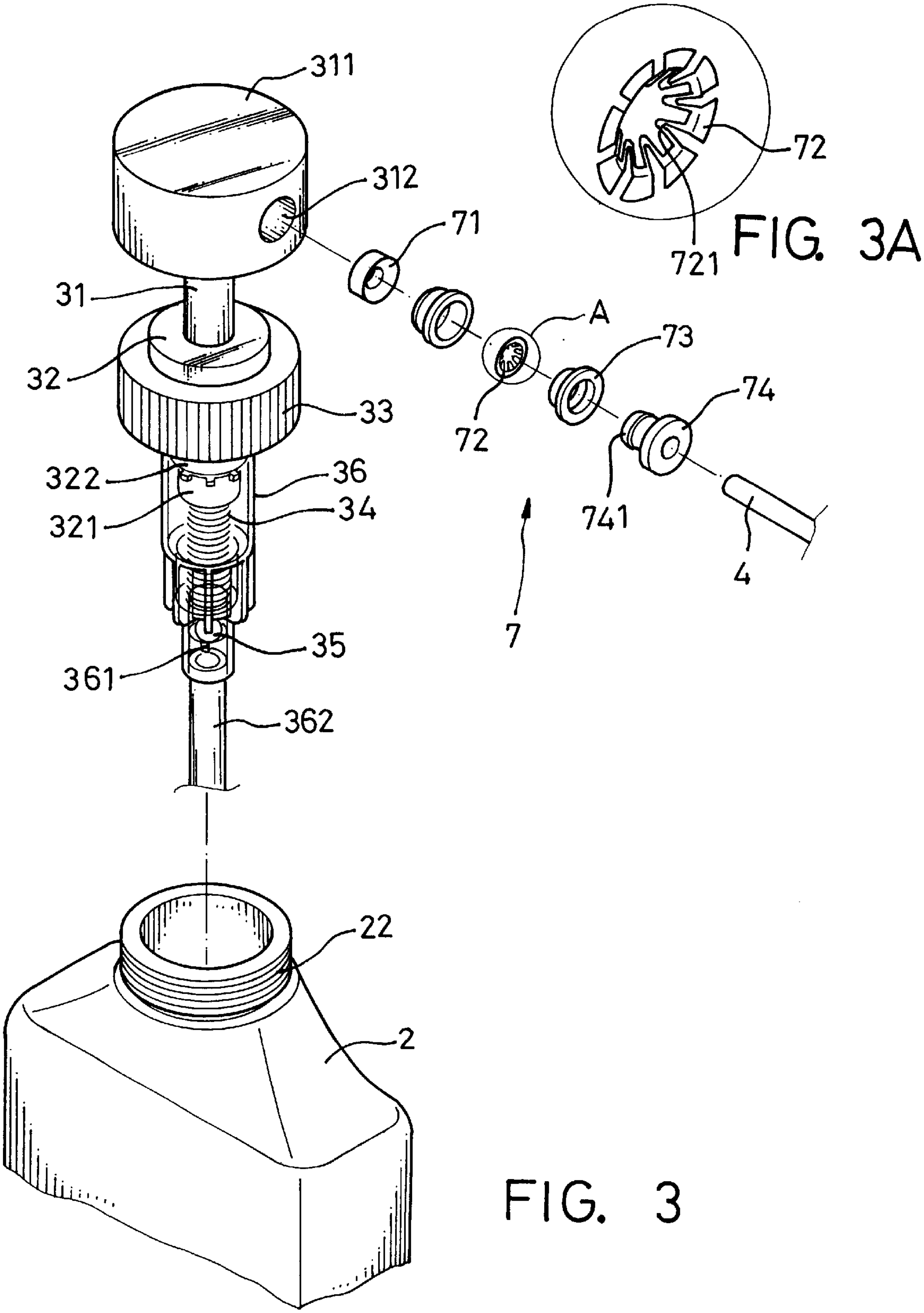
FIG. 3 is an exploded perspective view of the smoke generator of the present invention.
FIG. 3A is an enlarged view of area A in FIG. 3.
Figure 4:
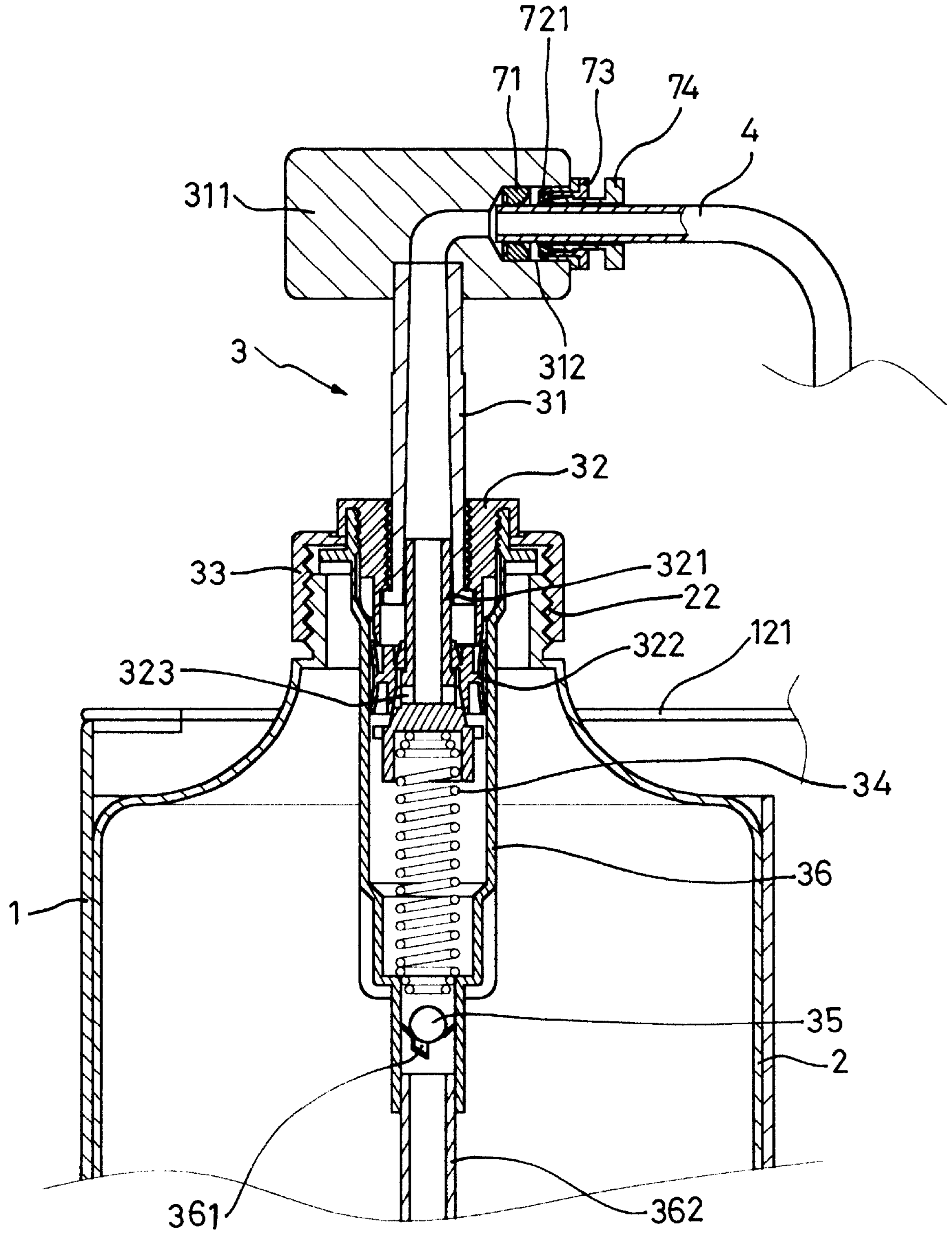
FIG. 4 is a sectional view of FIG. 3 in an assembled state.

With reference to FIGS. 2 to 4, a smoke generator according to the present invention includes a housing 1, a container 2, a drawing device 3, a transfer tube 4, a heat-resisting tube 5, and a heating vaporizing device 6.

The housing 1 is a hollow housing including a base 11 for supporting components to be described hereinafter, and a top opening sealed by a top cover 12, which is formed with a cover hole 121 in a position corresponding to the container 2 for extension of the drawing device 3.

The container 2 is disposed on one side within the base 11, and contains a chemical solution 21. The container 2 of this invention differs from the prior art in that it has a top portion provided with a coupling portion 22, such as a threaded portion, for connection with the drawing device 3.

The drawing device 3 is a press type liquid drawing structure, such as that shown in FIGS. 3 and 4, and includes a hollow tube 31 and a fastening ring member 32 fitted therewith, and a core rod 321 having an elastic ring 322 insertably disposed therebelow. The core rod 321 is provided with a rod hole 323. A sealing cap 33 is disposed to abut against the fastening ring member 32. An elongated hollow pump 36 is connected to the fastening ring member 32 such that the sealing cap 33 is sandwiched therebetween and such that the elastic ring 322 abuts against the inner wall of the pump 36. The pump 36 has a retractable spring 34 disposed therein and between the core rod 321 and the bottom portion of the pump 36, and a plug ball 35 capable of removably sealing a pump hole 361 in the bottom portion of the pump 36. The bottom portion of the pump 36 is further provided with an extension tube 362 that extends into the bottom portion of the container 12. Then, the sealing cap 33 is coupled with the coupling portion 22 so that the drawing device 3 can be disposed securely on the upper side of the container.

When a press member 311 at the upper end of the tube 31 is pressed, the tube 31 together with the core rod 321 displaces downwardly while the elastic ring 322 displaces along the inner wall of the pump 36 so that the spring 34 is compressed. Due to the sealing the pump hole 361 by the plug ball 36, the chemical solution 21 within the pump can flow only via the rod hole 323 of the core rod 321 into the passage and out through a liquid outlet 312 in the press member 311. When the press member 311 is released, the spring 34 extends so that the core rod 321 and the tube 31 displaces upwardly synchronously, and the chemical solution 21 in the container 2, due to a vacuumizing action caused by displacement of the elastic ring 322 against the inner wall of the pump 36, passes through the extension tube 342 and the pump hole 361 to plunge against the plug ball 35 to cause the latter to float upward, so that the chemical solution 21 enters the pump 36. Then, the plug ball 35 will seal the pump hole 361 once again by virtue of gravity so that the chemical solution 21 can stay within the pump 36.

The transfer tube 4 is a flexible tube having one end engaged with the liquid outlet 312, and the other connected to an engaging hole 51 of the heat-resisting tube 5.

The heat-resisting tube 5 is a metallic tube that prevents melting of the tube body when subjected to high temperature. One end thereof is provided with the engaging hole 51 for connection with the transfer tube. The other end thereof is connected to the conventional heating vaporizing device 6.

Figure 1:
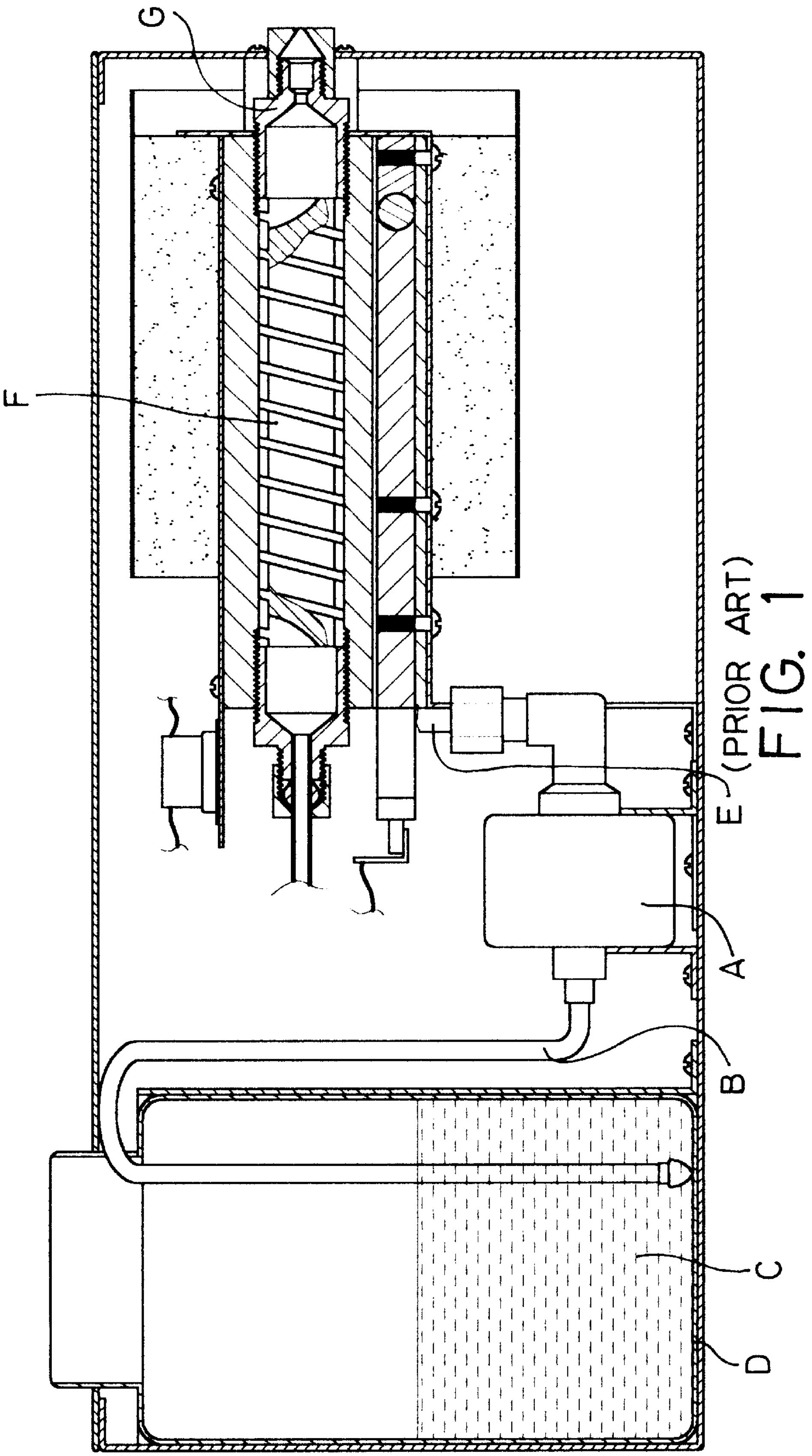
(PRIOR ART) FIG. 1
FIG. 1 is a schematic view of a conventional smoke generator.
Figure 5:
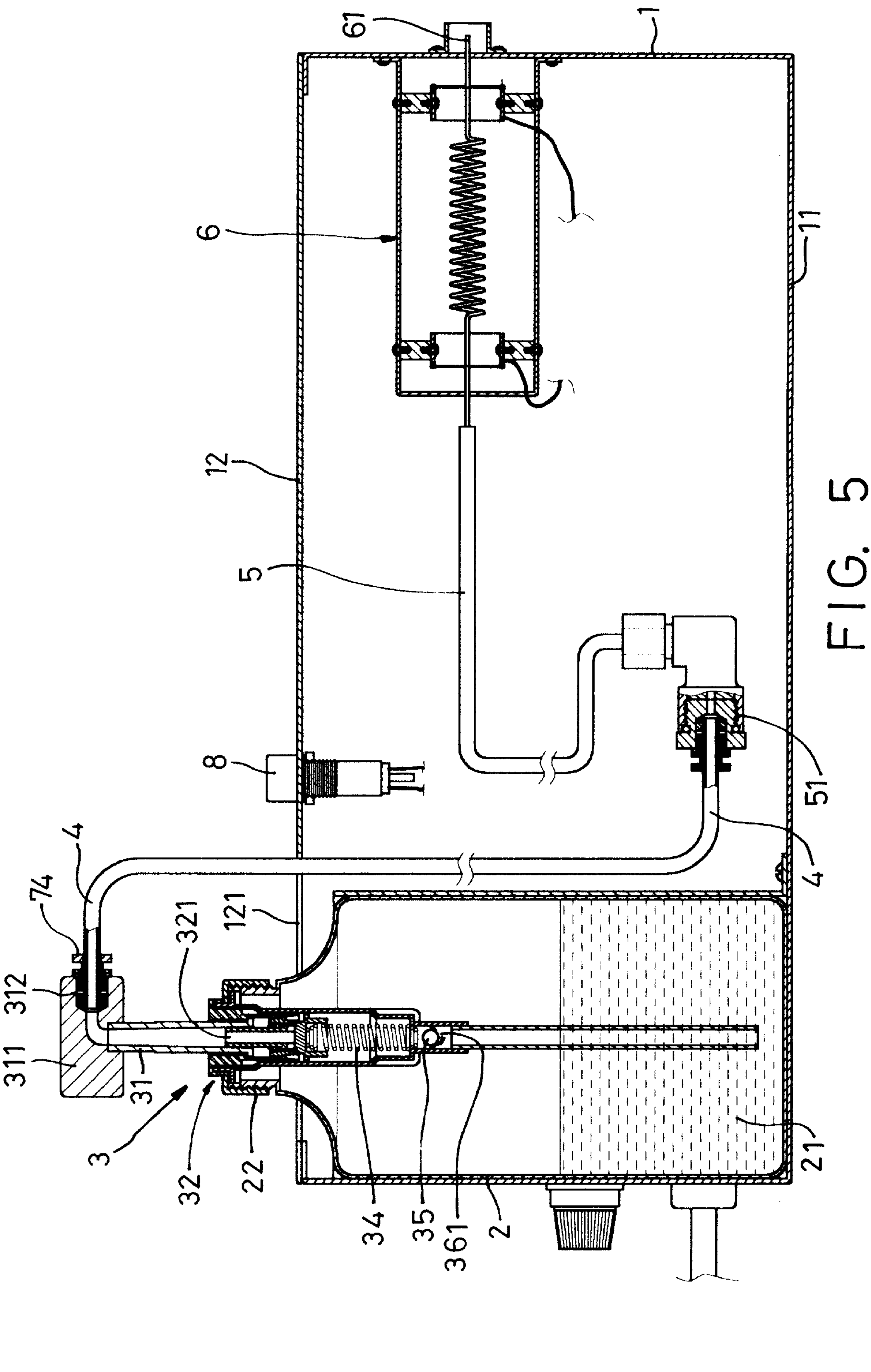
FIG. 5 is a schematic view showing the present invention with another type of heating vaporizing device.

The heating vaporizing device 6 has a conventional construction that is disposed to heat and vaporize the chemical solution 21 transferred from the heat-resisting tube 5 and flowing in the flow path thereof into smoke for ejection through a nozzle 61 at the rear end thereof. FIG. 2 and FIG. 1 each shows a thermoelectric type heating vaporizing device under R.O.C. Utility Model Patent No. 119039 owned by the inventor. Alternatively, the resistive type heating vaporizing device shown in FIG. 5 and published under R.O.C. Patent Publication No. 405441 (equivalent to U.S. patent application Ser. No. 09/330,184) can be adopted as the heating vaporizing device 6. As the two heating vaporizing devices mentioned above have been published, the relevant technical means will not be discussed in detail herein for the sake of brevity.

In addition, in order to ensure that the transfer tube 4 can be connected between the liquid outlet 312 and the engaging hole 51, the liquid outlet 312 and the engaging hole 51 are respectively provided with a speed connector 7, which includes a leakage stop ring 71 insertably disposed in each of the liquid outlet 312 and the engaging hole 51. An inner annular plate 72 with a plurality of pointed angular plates 721 at its inner ring is secured on the inner side of an end plug 73 that seals each of the liquid outlet 312 and engaging hole 51. Finally, a projecting portion 741 of a control ring 74 is inserted into the end plug 73 to complete assembly of the speed connector 7 with each of the liquid outlet 312 and engaging hole 51. At this time, the end portion of the transfer tube 4 can pass through the control ring 74 and end plug 73 to be clamped by the pointed angular plates 721 of the inner annular plate 72 and cannot be pulled out from the outside. To release, it is only necessary to press the control ring 74 so that the projecting portion 741 displaces toward the inner annular plate 72. When the projecting portion contacts the pointed angular plates 721, they will extend outwardly to permit smooth removal of the transfer tube 4.

Furthermore, the present invention includes an indicator light 8 provided on the housing 1 at a conspicuous position. When the heating vaporizing device 6 preheats to a temperature when the chemical solution 21 can be vaporized, the indicator light 8 will go out, indicating that the user can proceed with the liquid supplying step.

Referring to FIGS. 2 to 5, to commence operation, the smoke generator is connected to electricity. The indicator light 8 is on, and the heating vaporizing device 6 preheats. When a predetermined temperature is reached, the indicator light 8 is off. At this time, the user can press the press member 311 of the drawing device 3 several times so that the chemical solution 21 in the container 2 passes through the drawing device 3 and speed connector 7 into the transfer tube 4. Then, the solution 21 in the transfer tuber 4 passes further through the heat-resisting tube into the heating vaporizing device 6 where it is heated and vaporized to form smoke that is ejected via the nozzle 61.

In the present invention, the press type drawing device takes the place of an electric pump to thereby reduce costs and obtain the following advantages:

1) Simple operation: Since the drawing device of this invention is exposed on the housing, it is convenient to operate. There is no need for a professional.
2) Long service life: Since the drawing device of this invention is of a mechanical type, it will not be damaged due to sudden surge of electric current. Thus, it has a longer service life.
3) Easy maintenance and replacement: If the drawing device is damaged due to improper use, it can be easily separated from the container for repair or replacement by the user.
4) Meeting demands of entertainment venues and homes: Since the present invention can be produced at low costs, it can be afforded by home users and entertainment venues to increase entertainment effects.

Although the present invention has been illustrated and described with reference to the preferred embodiment thereof, it should be understood that it is in no way limited to the details of such embodiment but is capable of numerous modifications within the scope of the appended claims.

What is claimed is:

1. A smoke generator, comprising a housing accommodating therein a container containing a chemical solution and a heating vaporizing device, said heating vaporizing device being connected to a first end of a heat-resisting tube, a second end of said heat-resisting tube being connected to a transfer tube via an engaging hole so as to form a transfer path for the chemical solution;

a drawing device provided between said container and said transfer tube for pumping the chemical solution from the container to the heat vaporizing device through the heat-resisting tube, the drawing device including: a hollow tube fitted with a fastening ring member, and a core rod with an elastic ring connected thereto, said core rod being provided with a through rod hole; a sealing cap abutting against said fastening ring member; a hollow pump being coupled with said fastening ring member such that said sealing cap is sandwiched therebetween, said elastic ring abutting against the inner wall of said pump, wherein said pump has a spring disposed therein between said core rod and a bottom portion of said pump, and a plug ball removably closing a pump hole in the bottom portion of said pump, the bottom portion of said pump being further provided with an extension tube for extension into the bottom portion of said container; said hollow tube having a top portion fitted with a press member which is formed with a liquid outlet in a lateral side thereof for connection with said transfer tube;

said sealing cap connected with a coupling portion at a top portion of said container, whereby, by pressing and releasing said press member the solution within said container is pumped into said transfer tube by said pump and flows through said heat-resisting rube into said heating vaporizing device, the solution being vaporized to form smoke that is ejected via a nozzle.

2. The smoke generator according to claim 1, wherein said sealing cap of said pump being coupled with said coupling portion of said container via threaded engagement.

3. The smoke generator according to claim 1, further comprising a speed connector provided in at least one of said liquid outlet of said press member and said engaging hole of said heat-resisting tube, the speed connector including a leakage stop ring inserted in said outlet or hole, an inner annular plate with an inner ring having a plurality of pointed angular plates being coupled with an end plug and inserted into said outlet or hole, a projecting portion of said control ring being inserted into said end plug to enable said transfer tube to pass through said control ring and end plug to be clamped between said pointed angular plates; wherein, when said control ring is pressed laterally, said projecting portion is caused to contact said pointed angular plates to force them to open outwardly so that said transfer tube can disengage from said speed connector.

4. The smoke generator according to claim 1, further comprising an indicator light that comes on and goes off indicating whether said heating vaporizing device can be operated.

* * * * *